United States Patent
Van Polen

(10) Patent No.: US 6,859,763 B2
(45) Date of Patent: Feb. 22, 2005

(54) TECHNIQUE FOR COMPUTING A MEASURE ON AN ULTRASONIC SIGNAL HAVING APPLICATION TO IDENTIFY VALVE DEFECTS IN OPERATING ENGINES

(75) Inventor: Jerry Van Polen, Oak Park, IL (US)

(73) Assignee: General Motors Corporation, Detroit, MI (US)

( * ) Notice: Subject to any disclaimer, the term of this patent is extended or adjusted under 35 U.S.C. 154(b) by 22 days.

(21) Appl. No.: 10/360,376

(22) Filed: Feb. 6, 2003

(65) Prior Publication Data

US 2003/0158712 A1 Aug. 21, 2003

Related U.S. Application Data

(60) Provisional application No. 60/357,516, filed on Feb. 15, 2002.

(51) Int. Cl.[7] .............................................. G06F 15/00
(52) U.S. Cl. ........................ 702/189; 702/31; 702/32; 702/111; 702/113
(58) Field of Search .......................... 702/31, 32, 111, 702/113, 189, 194; 701/19, 20, 84, 85; 73/23.22, 23.23, 23.35, 23.36; 105/57

(56) References Cited

U.S. PATENT DOCUMENTS

| | | | | |
|---|---|---|---|---|
| 4,292,841 A | * | 10/1981 | Wesley ...................... 73/119 A |
| 4,444,049 A | * | 4/1984 | Hitchcock ................. 73/119 A |
| 5,121,443 A | * | 6/1992 | Tomlinson .................. 382/156 |
| 5,377,131 A | * | 12/1994 | Ottesen et al. .............. 708/304 |
| 5,467,185 A | * | 11/1995 | Engeler et al. ............... 356/44 |
| 5,930,136 A | * | 7/1999 | Nakajima et al. ............. 700/48 |
| 6,085,727 A | * | 7/2000 | Nakano ...................... 123/447 |
| 6,195,020 B1 | * | 2/2001 | Brodeur et al. ............. 246/125 |
| 6,230,546 B1 | | 5/2001 | Wilstermann et al. |
| 6,278,914 B1 | * | 8/2001 | Gaudreau et al. ............. 701/19 |
| 6,455,850 B1 | * | 9/2002 | Coates et al. ............ 250/338.1 |
| 6,535,810 B2 | * | 3/2003 | Volpe et al. ................. 701/114 |
| 6,707,043 B2 | * | 3/2004 | Coates et al. .......... 250/339.09 |
| 2004/0031856 A1 | * | 2/2004 | Atsmon et al. ............. 235/492 |

FOREIGN PATENT DOCUMENTS

| | | |
|---|---|---|
| AT | 389943 B | 2/1990 |
| DE | 3207556 | 8/1983 |
| EP | 0871 036 A2 | 10/1998 |

OTHER PUBLICATIONS

Bardou, O., Sidahmed, M., Watermetz, M.; "Early Detection of Leakages in Outlet Valves in High Power Diesel Engines Using Vibrations"; Mecanique Materlaux Electricite, Editions Science Et. Industrie. Paris, Fr. No. 446, Oct. 1, 1992.

Wright, L.A., Harris, D.H.C., Egelstaff, P.A.; "Improvements In Thermal Neutron Scintillation Detectors for Time-of-Flight Studies", Nuclear Instruments & Methods, 1965.

* cited by examiner

Primary Examiner—Carol S W Tsai
(74) Attorney, Agent, or Firm—Cary W. Brooks

(57) ABSTRACT

A measurement technique that generates a number value identifying the width of a noisy pulse in an analog signal that has particular application for determining whether a defect exists in a cylinder valve of a locomotive diesel engine. The algorithm samples the analog signal, and then the samples are bunched into successive groups where each group includes a predetermined number of samples. A root mean square is taken of the samples in each group to generate a representative amplitude value for that group. Successive amplitude values are multiplied together to generate product values. The product values are averaged over a predetermined number of product values to generate the number value that can be analyzed to determine if a defect in a valve exists.

21 Claims, 2 Drawing Sheets

TECHNIQUE FOR COMPUTING A MEASURE ON AN ULTRASONIC SIGNAL HAVING APPLICATION TO IDENTIFY VALVE DEFECTS IN OPERATING ENGINES

CROSS REFERENCE TO RELATED APPLICATIONS

This application claims the benefit of U.S. provisional application No. 60/357,516, titled "Technique for Computing a Measure on an Ultrasonic Signal Having Application to Identify Valve Defects in Operating Engines," filed Feb. 15, 2002.

BACKGROUND OF THE INVENTION

1. Field of the Invention

This invention relates generally to a technique for measuring the width of a noisy pulse in an analog signal and, more particularly, to a technique for remotely determining whether a valve associated with a cylinder in a locomotive diesel engine is defective by measuring the width of ultrasonic pulses emitted therefrom.

2. Discussion of the Related Art

Locomotives employ diesel engines having sixteen or more cylinders. Each cylinder employs several valves, for example four valves, where some of the valves allow a fuel/air mixture to be emitted into the cylinder and other of the valves allow exhaust gas to be removed from the cylinder. It is important that the seal integrity of the valve relative to the valve seat around the opening in the cylinder is sufficient so that the engine operates properly and is not damaged. However, the rigors of the combustion process within the cylinder sometimes causes cracks and other defects in the valve or the valve seat which may affect seal integrity. Continued operation of the engine with a defective valve may cause valve failure. Further, valve failure in a locomotive engine can result in damage to the engine turbocharger which may cost $100,000.00 or more to replace or fix.

Heretofore, it was usually necessary for a technician to visually inspect the valve and valve seat to look for evidence of cracking or other damage during maintenance over hauls and the like. This is a costly process because the valve head needs to be removed and each valve inspected which includes significant labor and downtime. Further, the inspection process is highly subjective in that the technician determines whether a defect exists by his or her own visual assessment and experience.

To overcome these problems, it is known in the art to employ a detection system including an ultrasonic sensor probe that detects ultrasonic emissions from the engine while it is idling. Ultrasonic emissions are typically emitted from the engine during such times as fuel injection and exhaust emission when the valves are opened. The probe is placed in contact with suitable locations on the cylinder head and a measurement is taken for each cylinder. The detection system includes processing circuitry that provides heterodyning by mixing the ultrasonic signal for frequency down-conversion purposes, for example 40 kHz to 0–3 kHz, to make the sound energy audible. The detection system also includes a headset for listening to the down-converted signal.

Because a defect in the valve causes additional gases to leak during the compression stroke, additional ultrasonic energy is emitted if such a defect exists. Therefore, by knowing the "sounds" that the engine cylinder makes with no defect, a technician can listen for higher intensity signals indicating the presence of a valve defect. However, such a technique for determining valve defects still includes a subjective aspect where the technician must determine the defect by the sound perceived. It would be desirable to provide a more cost effective and objective technique for determining if a defect exists in a valve or valve seat associated with a cylinder of a locomotive engine.

SUMMARY OF THE INVENTION

In accordance with the teachings of the present invention, a measurement technique is disclosed that generates a number value identifying the width of a noisy pulse in an analog signal. In one embodiment, the noisy pulse is part of a down-converted ultrasonic signal detected from sound transmissions from a cylinder in a locomotive diesel engine. A wider pulse, and thus a higher number value, provides an indication of whether a valve associated with the cylinder is defective, where the sealing integrity of the valve has been compromised.

The technique employs a mathematical algorithm that samples the down-converted signal at predetermined periods of time to provide an analog-to-digital conversion. The samples are then bunched into successive groups, where each group includes a predetermined number of samples. A root mean square is taken of the samples in each group to generate a representative amplitude value for that group. Successive amplitude values, such as three successive values, are then multiplied together to generate product values. The product values are averaged over a predetermined number of product values to generate the number value that can be analyzed to determine if a defect in the valve exists. If a noisy pulse in the signal generates a number value that is greater than a certain number valve, then the valve can be determined to have a defect. The number value can be ratioed against another product value of the amplitude values to compensate for gain differences in the signal.

Additional objects, advantages and features of the present invention will become apparent from the following description and appended claims, taken in conjunction with the accompanying drawings.

DETAILED DESCRIPTION OF THE INVENTION

The following discussion of the invention directed to a mathematical technique for determining whether a defect exists in a valve of a cylinder of an engine is merely exemplary in nature, and is in no way intended to limit the invention or its applications or uses. Particularly, the discussion below concerns determining defects in a valve of a locomotive diesel engine. However, as will be appreciated by those skilled in the art, the algorithm of the present invention has a much wider application.

Figure 1:
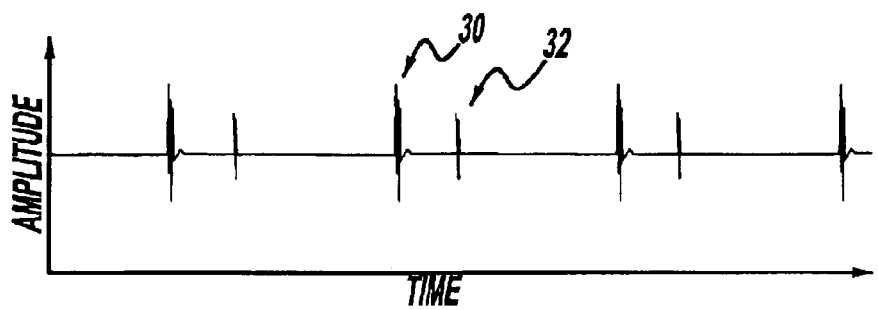
FIG. 1 is a graph showing down-converted ultrasonic emissions from an engine cylinder having a valve with no defects.
Figure 2:
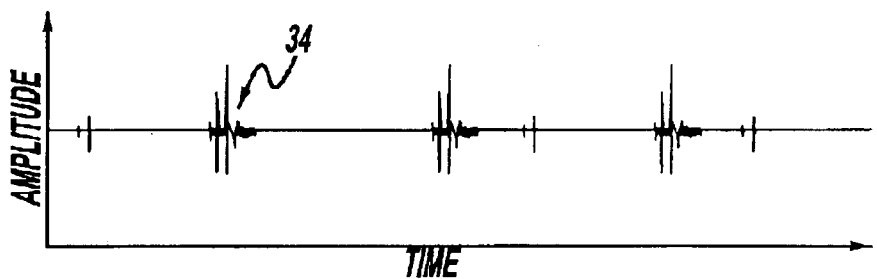
FIG. 2 is a graph showing down-converted ultrasonic emissions from an engine cylinder having a valve with a 1/32 by 1/32 size defect.
Figure 3:
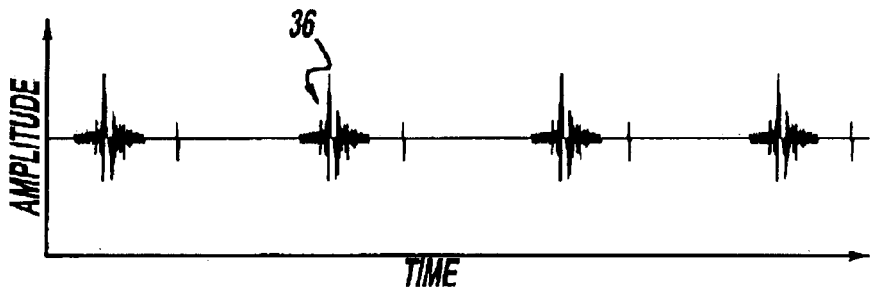
FIG. 3 is a graph showing down-converted ultrasonic emissions from a cylinder having a valve with a 1/32 by 1/16 size defect.
Figure 4:
FIG. 4 is a graph showing down-converted ultrasonic emissions from a cylinder having a valve with a 1/32 by 3/16 size defect.
Figure 5:
FIG. 5 is a graph showing down-converted ultrasonic emissions from a cylinder having a valve with a 1/32 by 1/8 size defect.

FIGS. 1–5 are various graphs of an analog ultrasonic signal emitted from a cylinder of a locomotive engine that has been down-converted to audible frequencies. The known ultrasonic engine probe was used to generate the analog down-converted ultrasonic signals shown in these figures. Each of the graphs show time on the horizontal axis and signal intensity on the vertical axis, and cover a few cycles of the locomotive engine. FIG. 1 shows the analog down-converted signal of a cylinder having valves with no defects, where fuel injection and exhaust valve opening are identified as noisy pulses on the graph.

The probe was used to sense the ultrasonic emissions from the engine cylinder where one of the valves of the cylinder had a known specific size defect. Particularly, the valve of the cylinder shown in FIG. 2 had a 1/32 by 1/32 size defect; the valve of the cylinder shown in FIG. 3 had a 1/3 by 1/16 size defect; the valve of the cylinder shown in FIG. 4 had a 1/32 by 3/16 size defect; and the valve of the cylinder shown in FIG. 5 had a 1/32 by 1/8 size defect. In these figures, reference numeral 30 shows a firing/injection pulse, reference numeral 32 shows an exhaust valve opening pulse, reference numeral 34 shows an increase in noise at high cylinder pressure after firing, reference numeral 36 shows an increase in noise as the cylinder pressurizes before firing, and reference numeral 38 shows significant noise before and after cylinder firing.

By comparing the signals outputs of FIGS. 1–5, it becomes clear that the defect causes the noisy pulses to have a greater magnitude and a longer duration in time, where the duration and magnitude of the pulse is determined by the size of the defect. This is consistent with the understanding that valves with a notch or crack at the edge would fail to seal against compression and combustion pressures, resulting in gas leakage and higher ultrasonic energies.

According to the invention, a mathematical algorithm is disclosed that generates a number value indicative of the width of noisy pulses in the down-converted analog output from a engine cylinder. By comparing the generated number value against a number value from a cylinder having no valve defects, a substantially objective technique is provided for determining valve defects in a cylinder valve. In one embodiment, the algorithm employs an appropriate sample interval, and assumes that all noisy pulses in the signal are less than three sample intervals long. If the pulses were sufficiently spaced, then, in the binary case, the product of any four successive samples would be zero or near zero. In such a case, the local discreet-time function comprising the product of four adjacent samples would be highly discriminatory against pulses below two or so intervals in duration. In other words, the product of the samples would be less for those pulses having shorter durations and greater for those pulses having a longer duration. Therefore, the present invention proposes computing a product of adjacent time samples to determine the duration of the noisy pulse to determine the width of the pulse, and thus, whether a defect exists.

Figure 6:
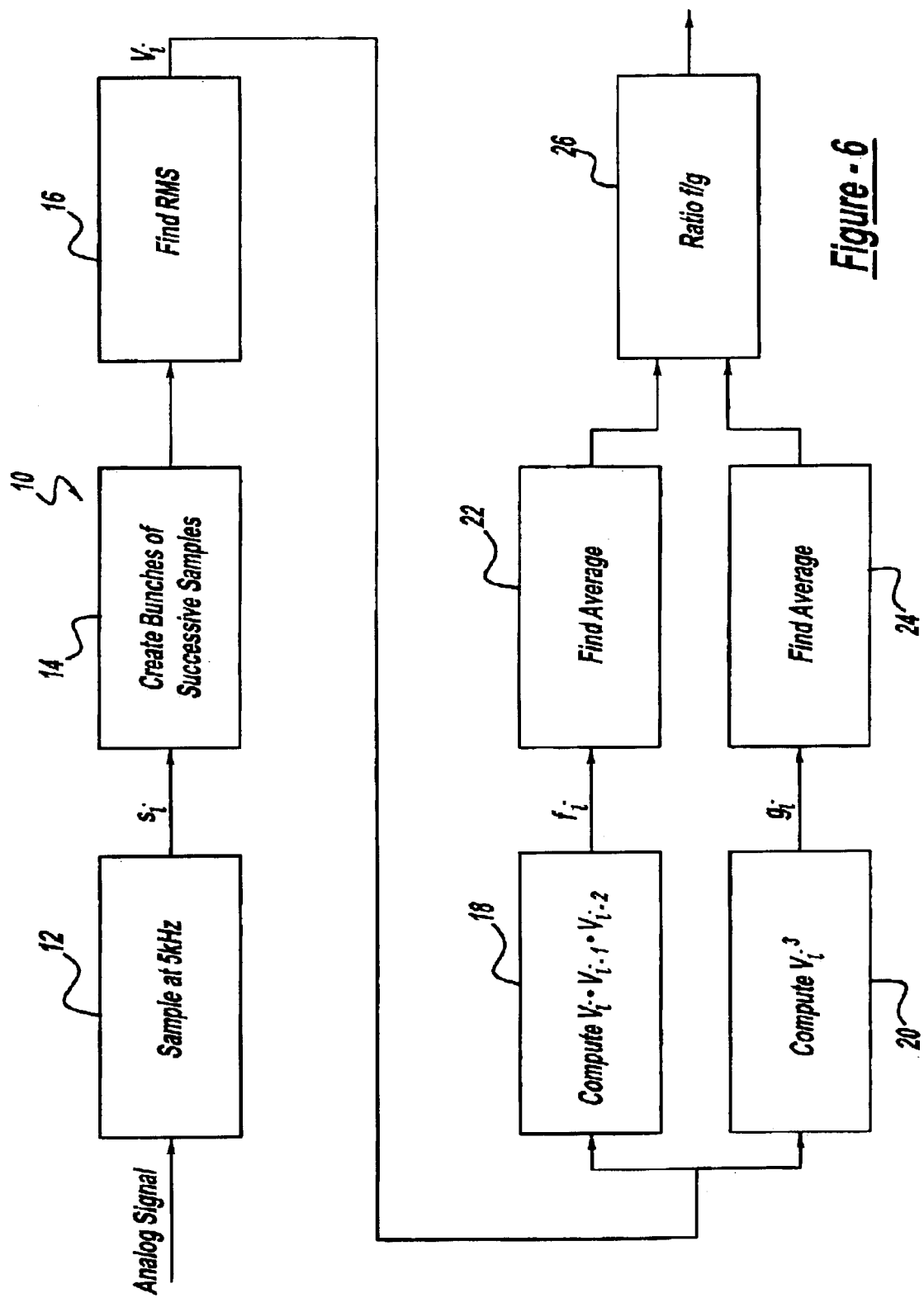
FIG. 6 is a block diagram showing a process of analyzing an ultrasonic signal from an engine cylinder to determine whether a defect exists in a valve of the cylinder, according to an embodiment of the present invention.

FIG. 6 is a block diagram 10 showing the operation of an algorithm of this type. The down-converted ultrasonic analog signal is applied to a sample device 12 that generates a pulse at every predetermined time period, here at 5 kHz. This is a sufficient statistical sampling of the signal because the frequency will be between 0–3 kHz and noisy. The sample device 12 acts as an analog-to-digital converter that converts the analog signal to plus and minus digital signals at the sample rate to generate a 5 kHz data stream $s_i$. The $s_i$ data stream is applied to a buncher device 14 that creates bunches of successive samples. In this example, 25 samples are bunched in 5 msec groups. A root mean square (RMS) device 16 calculates the RMS of each 25 samples in each group. The RMS of each bunch gives a representative amplitude $V_i$ for the pulses in that group. Thus, for every 5 msec, a new $V_i$ is generated providing a 200 Hz data stream corresponding to the RMS of each bunch.

The values $V_i$ are applied to a multiplying device 18 and a multiplying device 20. The multiplying device 18 computes a product for every three consecutive $V_i$, or $V_i$, $V_{i-1}$, and $V_{i-2}$, and generates a product value $f_i$. Thus, the longer the pulse of noise in the analog input signal, the greater the computed value. Therefore, if a particular pulse is more than a single bunch of 25 successive samples long, then the product will be greater than if the pulse width was less than the bunch sample time for collecting the bunch. The multiplying device 20 cubes each value $V_i$ for normalization purposes and generates a product value $g_i$. This normalization step is important to compensate for gain variations that may occur in the devices 12, 14 and 16 and the ultrasonic pickup of the probe (not shown). Thus, by cubing each value $V_i$, variations in gain in the signal do not affect the overall output.

The product value $f_i$ is applied to an averaging device 22 and the product value $g_i$ is applied to an averaging device 24. The averaging devices 22 and 24 can generate an average, a means, a percentile, etc., on a moving basis or on a finite block of data. The averaging device 22 averages successive values $f_i$, and the averaging device 24 averages successive values $g_i$, preferably over each stroke of the engine. For example, each of the averaging devices 22 and 24 averages about 50 samples. The average values are applied to a ratio device 26 that generates a ratio of f/g. Thus, if the value computed in the multiplying device 18 is high because the pulse width is larger than normal as a result of a valve defect, then the ratio f/g will be higher than what is normally seen in a non-defective valve. Therefore, a number greater than a predetermined number value of a non-defective valve indicates a defective valve.

One of normal skill in the art would readily recognize what various circuits could be used for each of the devices 12, 14, 16, 18, 20, 22, 24 and 26 discussed above. Further, the various operations discussed herein could be performed by suitable software programs, also readily apparent to those skilled in the art.

Other embodiments of the invention can apply more sophisticated processing, including employing fourier transforms or other known mathematical algorithms, to multiply continuous samples together consistent with the discussion herein. However, the embodiment discussed above employs reduced processor memory and processing power to perform the same operation. Other approaches include exploiting wavelet analysis to map a function of one variable, time, into a function of two variables, time and duration. Wavelet analysis relies on the computation of convolution integrals at each point in time for a potentially large number of similarly-shaped functions of time-scale or duration. The resulting two-dimensional function, presented as a contour plot, can provide a visual indication of underlying processes characterized by different time scales, periods and phases, such as appear to be present in the data provided in FIGS. 2–5.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method of generating a number value representative of the width of a noisy pulse in an analog signal, said method comprising:

sampling the analog signal at predetermined sample intervals to generate a sampled signal including samples;

creating bunches of successive samples in the sampled signal over a predetermined bunched sample period to generate a sequence of bunched samples; and multiplying the bunched samples over at least two successive bunched sample periods to generate a first product value, where the first product value is representative of the width of the noisy pulse.

2. The method according to claim 1 further comprising determining a root mean square of each bunched sample, and multiplying the root mean square of successive bunched samples over the at least two bunched sample periods to generate the first product value.

3. The method according to claim 1 further comprising averaging a predetermined number of the first product values to generate the number value.

4. The method according to claim 3 wherein averaging the first product value includes one of finding an average value, finding a peak value or finding a percentile value.

5. The method according to claim 1 further comprising multiplying each bunched sample by itself to generate a second product value, where the first product value and the second product value are ratioed to generate the number value.

6. The method according to claim 1 wherein sampling the analog signal includes converting the analog signal to a digital signal.

7. The method according to claim 1 wherein the sample intervals are 5 kHz.

8. The method according to claim 1 wherein the bunched samples includes 25 samples.

9. The method according to claim 1 wherein the at least two successive bunched sample periods is three bunched sample periods so that three bunched samples are multiplied together.

10. The method according to claim 1 wherein the analog signal is a down-converted ultrasonic signal emitted from a cylinder of an engine.

11. The method according to claim 10 wherein the engine is a locomotive engine.

12. A method of generating a number value representative of the width of a noisy pulse in an analog signal, where the analog signal is a down-converted ultrasonic signal emitted from a cylinder of a locomotive engine, said method comprising:

sampling the analog signal at predetermined sample intervals to generate a sampled signal including samples;

creating bunches of successive samples in the sampled signal over a predetermined bunched sample period to generate a sequence of bunched samples;

generating a root mean square of each bunched sample;

multiplying at least two successive bunched samples to generate a first product value;

cubing each root mean squared bunched sample to generate a second product value;

averaging the first product value and the second product value over a plurality of product values to generate a first averaged product value and a second averaged product value; and ratioing the first averaged product value and the second averaged product value to generate the number value.

13. The method according to claim 12 wherein averaging the first product value and the second product value includes one of finding an average value, finding a peak value or finding a percentile value.

14. The method according to claim 12 wherein sampling the analog signal includes converting the analog signal to a digital signal.

15. The method according to claim 12 wherein the sample intervals are 5 kHz, and the bunched samples includes 25 samples.

16. The method according to claim 12 wherein the at least two successive bunched sample periods is three successive bunched sample periods so that three bunched samples are multiplied together.

17. A system for generating a number value representative of the width of a noisy pulse in an analog signal, said system comprising:

a sampling device for sampling the analog signal at predetermined sample intervals to generate a sampled signal including samples;

a bunching device for bunching successive samples in the sampled signal over a predetermined bunched sample period to generate a sequence of bunched samples; and a first multiplying device for multiplying the bunched samples over at least two successive bunched sample periods to generate a first product value, where the first product value is representative of the width of the noisy pulse.

18. The system according to claim 17 further comprising a root mean square device for root mean squaring each bunched sample, wherein the first multiplying device multiplies the root mean square of successive bunched samples over the at least two bunched sample periods to generate the first product value.

19. The system according to claim 17 further comprising an averaging device for averaging a predetermined number of the first product values to generate the number value.

20. The system according to claim 17 further comprising a second multiplying device for multiplying each bunched sample by itself to generate a second product value, wherein the first product value and the second product value are ratioed to generated the number value.

21. The system according to claim 17 wherein the analog signal is a down-converted ultrasonic signal emitted from a cylinder of a locomotive engine.

* * * * *